(12) United States Patent
Noel et al.

(10) Patent No.: US 9,319,984 B2
(45) Date of Patent: Apr. 19, 2016

(54) POWER SUPPLY CONTROL IN A WIRELESS RECEIVER

(75) Inventors: Denis Noel, Grez-Doiceau (BE); Steven Aerts, Oud-Heverlee (BE); Harry Neuteboom, Eindhoven (NL)

(73) Assignee: NXP Semiconductors, Eindhoven (NL)

( * ) Notice: Subject to any disclaimer, the term of this patent is extended or adjusted under 35 U.S.C. 154(b) by 623 days.

(21) Appl. No.: 12/864,810

(22) PCT Filed: Jan. 28, 2009

(86) PCT No.: PCT/IB2009/050347
§ 371 (c)(1),
(2), (4) Date: Jul. 27, 2010

(87) PCT Pub. No.: WO2009/095869
PCT Pub. Date: Aug. 6, 2009

(65) Prior Publication Data
US 2010/0322228 A1    Dec. 23, 2010

(30) Foreign Application Priority Data
Feb. 1, 2008 (EP) ..................................... 08101222

(51) Int. Cl.
*H04W 52/02* (2009.01)
*H04B 5/02* (2006.01)
*H04B 17/318* (2015.01)
*H04B 17/26* (2015.01)

(52) U.S. Cl.
CPC ............. *H04W 52/0245* (2013.01); *H04B 5/02* (2013.01); *H04B 17/318* (2015.01); *H04B 17/26* (2015.01); *Y02B 60/50* (2013.01)

(58) Field of Classification Search
CPC .. H04B 17/0057; H04B 52/0245; H04B 5/02; H04B 16/007
USPC .......................... 370/310, 345; 455/403, 418
See application file for complete search history.

(56) References Cited

U.S. PATENT DOCUMENTS

| | | | |
|---|---|---|---|
| 4,761,830 A | 8/1988 | Izumi | |
| 5,307,379 A | 4/1994 | Bergstrom et al. | |
| 5,396,484 A * | 3/1995 | Itoh | ............................... 370/204 |
| 5,701,598 A * | 12/1997 | Atkinson | .................... 455/161.2 |
| 5,995,806 A | 11/1999 | Tsubouchi et al. | |
| 6,567,384 B1 | 5/2003 | Shimbo | |
| 6,810,321 B1 * | 10/2004 | Cook | ............................. 701/117 |

(Continued)

FOREIGN PATENT DOCUMENTS

| | | |
|---|---|---|
| EP | 0 651 521 A2 | 5/1995 |
| EP | 1 164 708 A2 | 12/2001 |

OTHER PUBLICATIONS

International Search Report and Written Opinion for Int'l. Patent Appln. No. PCT/IB2009/050347 (Jan. 28, 2009).

*Primary Examiner* — Siming Liu

(57) ABSTRACT

A wireless receiver is activated periodically to measure the level of received signals. It measures the average received level over a plurality of the activation periods, and enables the supply of power to receiver circuitry dependent on the measured average value. In one embodiment the power is enabled if an increase in the average value is detected which is greater than a predetermined margin. The average value may be measured in a sliding or stepped window. In another embodiment the power is enabled if the level in an activation period exceeds the average value by a predetermined margin.

18 Claims, 2 Drawing Sheets

(56) References Cited

U.S. PATENT DOCUMENTS

| | | | |
|---|---|---|---|
| 7,218,277 B1* | 5/2007 | Smith | 342/359 |
| 2006/0073825 A1 | 4/2006 | Palermo et al. | |
| 2006/0098749 A1* | 5/2006 | Sung et al. | 375/260 |
| 2006/0160562 A1* | 7/2006 | Davis et al. | 455/550.1 |
| 2006/0270382 A1* | 11/2006 | Lappetelainen et al. | 455/343.2 |
| 2007/0082647 A1* | 4/2007 | Behzad et al. | 455/343.1 |
| 2007/0149261 A1* | 6/2007 | Huddart | 455/575.2 |
| 2011/0207475 A1* | 8/2011 | Karr et al. | 455/456.1 |

* cited by examiner

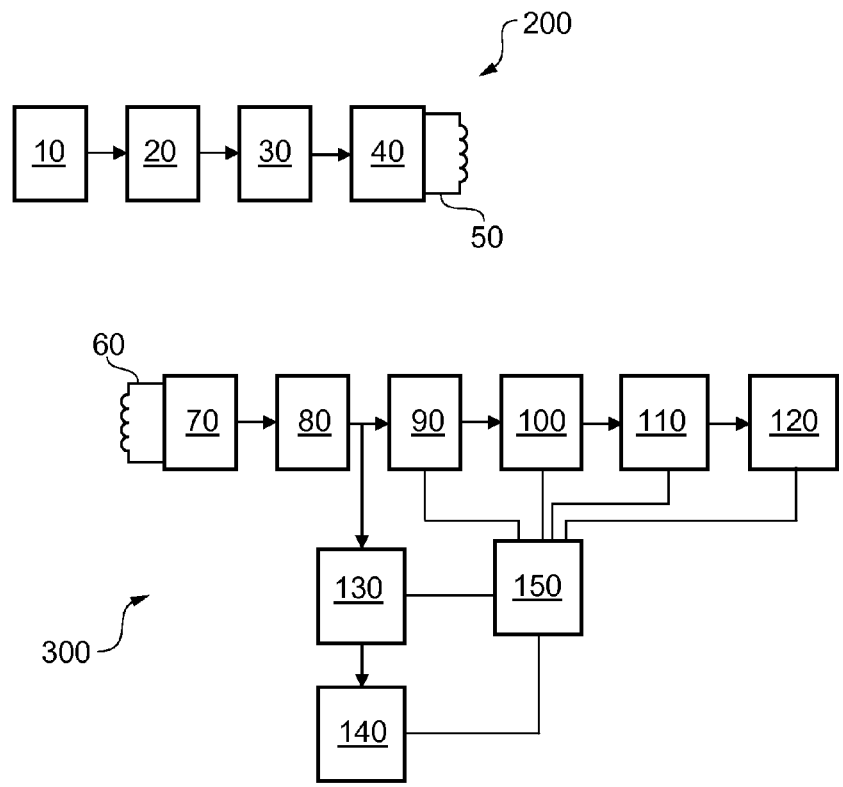
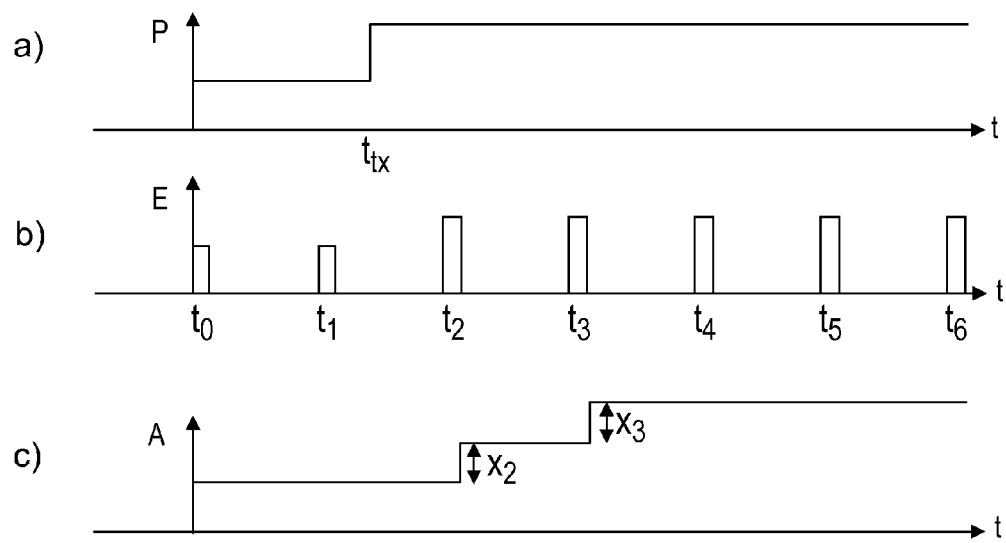
FIG. 1
FIG. 2

POWER SUPPLY CONTROL IN A WIRELESS RECEIVER

FIELD OF THE INVENTION

The invention relates to a wireless receiver and method of operating a wireless receiver, and in particular to controlling power supply in a wireless receiver. The invention is particularly, but not exclusively, applicable to a magnetic induction receiver.

BACKGROUND TO THE INVENTION

Magnetic induction technology is based on the quasi-static magnetic component of the field generated by a coil through which a sinusoidal current is flowing. When a second coil is introduced within that field, the magnetic flux passing through that second coil induces a modulated current in it. This phenomenon has been used for communication between a magnetic induction transmitter and magnetic induction receiver using near-field propagation where the magnetic field is much greater than the electric field and is inversely proportional to the cube of the distance from the transmitting coil. The coils are tuned to resonate at a desired frequency by employing programmable capacitance. The coils may be mounted on a ferrite core to increase the transmission efficiency. Typical operating parameters for a magnetic induction communication system, such as may be employed for an ultra low power hearing aid, are a carrier frequency of 10.579 MHz and a modulation rate of 298 kbits$^{-1}$ using FSK modulation at a modulation index of 1.0 and having a bandwidth of about 600 kHz. A receiver in such a low power communication system has a sleep mode in which power is conserved by powering-up the receiver only intermittently to monitor for a received signal, and maintaining the receiver powered-up to synchronise only if a signal is present.

An object of the invention is to enable improved power conservation in a wireless receiver.

SUMMARY OF THE INVENTION

According to a first aspect of the invention there is provided a method of operating a wireless receiver, comprising: measuring a level of energy received in each of intermittent time periods; generating a first value dependent on the levels of energy in a first plurality of the time periods; and enabling, dependent on the first value, the supply of power to a circuit.

According to a second aspect of the invention there is provided a wireless receiver, comprising: a measurement circuit for measuring a level of energy received in each of intermittent time periods; an evaluation circuit for generating a first value dependent on the levels of energy in a first plurality of the time periods; and a controller for enabling, dependent on the first value, the supply of power to a circuit.

Thus, the wireless receiver measures the energy received in individual intermittent time periods and controls the power supply to a circuit, depending on a function of a plurality of the energy measurements. In this way, power can be saved when wanted signals are unlikely to be received, as indicated by the value of the function. When the average energy level changes with time, the value of the function will vary, and so the control of power saving can be adapted to the current average energy level. This can enable the level of variable unwanted signals or noise to be taken into account when exercising power control.

In one embodiment the receiver may generate a second value dependent on the levels of energy in a second plurality of the time periods, the second plurality including at least one time period occurring later than the time periods of the first plurality; and enable the supply of power if the second value exceeds the first value by more than a first margin. This enables the control of the power to be dependent on the change in average energy level, and power to be conserved if the increase in average energy is insufficient to enable reliable reception of a wanted signal in the presence of unwanted signals, including noise.

At least one of the time periods may be common to the first plurality of time periods and the second plurality of time periods. This enables successive ones of the first and second values to be calculated in a sliding window or a window stepped through overlapping positions, or calculated for a recursive function stepped through successive positions.

In another embodiment the receiver may enable the supply of power if the level of energy in at least one of the time periods exceeds the first value by more than a second margin. This enables power to be conserved if the short term energy level is not greater than the average energy level by a sufficient margin for reliable reception of a wanted signal in the presence of unwanted signals, including noise.

Optionally, the first and/or the second value may be generated based on a recursive function of the levels of energy in the respective plurality of time periods. In particular, the first and/or the second value may be generated according to the function $A_n = (1-\alpha)A_{n-1} + \alpha \cdot E_n$, where $A_n$ is the value generated for the $n^{th}$ time period, $E_n$ is the level of energy in the $n^{th}$ time period, and $\alpha$ is a constant less than unity. This can provide an indication of average energy level whilst requiring only a small amount of storage.

The wireless receiver may be a magnetic induction receiver.

The invention also provides: a computer program adapted to perform the method according to the first aspect of the invention; a wireless transceiver comprising the wireless receiver according to the second aspect of the invention; and a wireless system comprising the wireless receiver according to the second aspect of the invention.

BRIEF DESCRIPTION OF THE DRAWINGS

The invention will now be described, by way of example only, with reference to the accompanying drawings in which:

FIG. 1 is a block schematic diagram of a magnetic induction transmitter and receiver;

FIG. 2 is a timing diagram illustrating the operation of an embodiment of the invention.

DETAILED DESCRIPTION OF EMBODIMENTS

Figure 3:
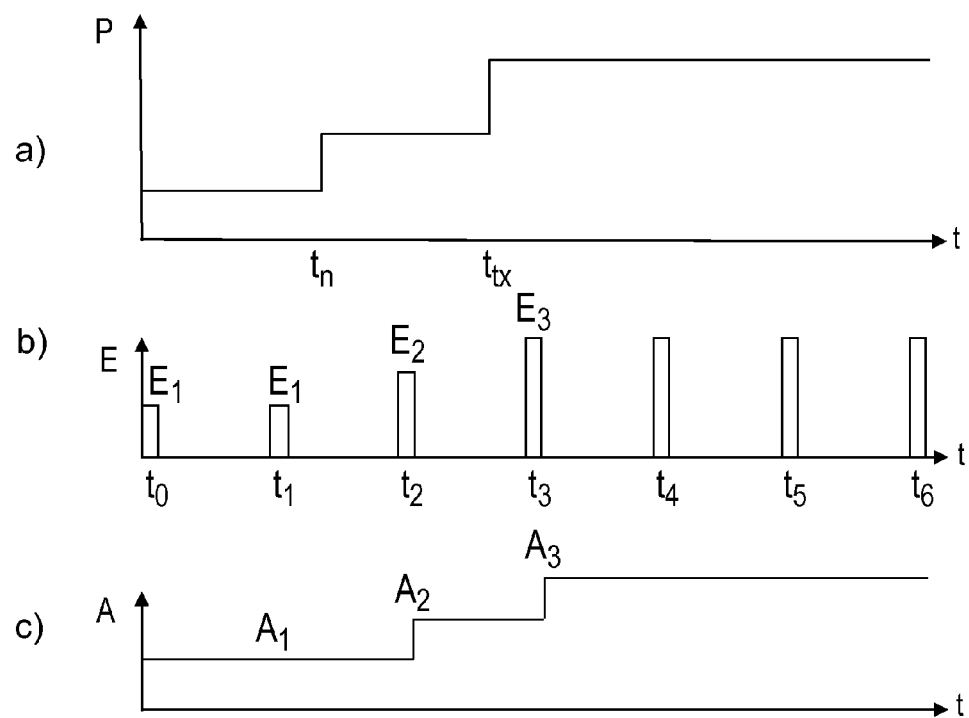
FIG. 3 is another timing diagram illustrating the operation of another embodiment of the invention.

Referring to FIG. 1, there is illustrated a magnetic induction transmitter 200 and magnetic induction receiver 300. The magnetic induction transmitter 200, for brevity referred to below as a transmitter 200, comprises an encoder 10 for encoding signals to be transmitted. An output of the encoder 10 is coupled to an input of a modulator 20 for modulating the encoded signals onto a carrier signal. An output of the modulator 20 is coupled to an input of an upconverter 30 for mixing the modulated carrier signal up to a higher frequency for transmission. An output of the upconverter 30 is coupled to an input of a coil driver 40 which supplies power to a coil 50 which is coupled to an output of the coil driver 40. The coil driver 40 is tuned to a desired transmission frequency by means of an inductor-capacitor tuned circuit (not illustrated).

The magnetic induction receiver 300, for brevity referred to below as a receiver 300, comprises a coil 60 for receiving signals transmitted by the coil 50. The coil 60 is coupled to an input of a tuner 70 which is tuned to the desired transmission frequency by means of an inductor-capacitor tuned circuit (not illustrated). An output of the tuner 70 is coupled to an input of an amplifier 80 for amplifying received signals. An output of the amplifier 80 is coupled to an input of a downconverter 90 for mixing received signals to a lower frequency. An output of the downconverter 90 is coupled to an input of a demodulator 100 for demodulating received signals. An output of the demodulator 100 is coupled to an input of a synchroniser 110 for detecting the occurrence of a wanted signal in demodulated signals. An output of the synchroniser 110 is coupled to an input of a decoder 120 for decoding a wanted signal that has been detected.

The receiver 300 further comprises a measurement circuit 130 coupled to the output of the amplifier 80 for generating an indication of the level of energy in received signals. The measurement circuit 130 is coupled to a controller 150 which controls the time periods over which the measurement circuit 130 generates the indication; in particular the indication is generated in each of intermittent time periods.

The receiver 300 further comprises an evaluation circuit 140 coupled to an output of the measurement circuit 130 for generating a value indicative of an average level of energy in received signals over a plurality of the intermittent time periods. The evaluation circuit 140 is coupled to the controller 150 which dictates the intermittent time periods over which the evaluation circuit 140 performs averaging. Preferably, the averaging is performed for successive positions of a sliding window or a window stepped through overlapping positions, in which, in successive positions, the energy level in the oldest of the time periods is discarded from the average and replaced by the energy level of the most recent of the time periods.

The value indicative of average level of energy in received signals over the plurality of the intermittent time periods is provided to the controller 150. The controller 150 is coupled to each of the downconverter 90, the demodulator 100, the synchroniser 110 and the decoder 120, for controlling the supply of power to these stages. Dependent on the indicated average level of energy, the controller 150 enables or inhibits the supply of power to these stages.

The operation, according to first and second embodiments, of the receiver 300 illustrated in FIG. 1 is described below with reference to FIGS. 2 and 3 respectively. In these examples, the controller initially inhibits the supply of power to the downconverter 90, the demodulator 100, the synchroniser 110 and the decoder 120.

FIG. 2, graph a) illustrates the power P at the desired operating frequency that reaches the coil 60 of the receiver 300 as a function of time t. The low initial power represents unwanted power, that is power emitted by sources other than the transmitter 200. At time $t_{rx}$, the power increases because the transmitter 200 commences transmission of a wanted signal to the receiver 300.

FIG. 2, graph b) illustrates the energy E measured by the receiver 300 in intermittent time periods occurring at times $t_0$ to $t_6$. The measured energy level increase at time $t_2$, which is the first measurement following the commencement of transmission at time $t_{rx}$ by the transmitter 200.

FIG. 2, graph c) illustrates the average energy A measured over a plurality of the time periods illustrated in graph b); in this example the plurality is two, the averaging being performed over a window encompassing two of the time periods and stepped by increments equal to the interval between the intermittent time periods. The initial level of the average energy A, preceding time $t_1$, is determined by the energy preceding time $t_0$ but which is not represented in graphs a) or b). The initial level of the average energy is maintained until time $t_2$, at which point the average energy A increases by an amount $x_2$ due to including in the average the energy E measured at time $t_2$ and discarding the energy measured at time $t_0$; the increased average value is the average of the energy measured at time $t_1$ and time $t_2$. The average energy A increases again at time $t_3$ by an amount $x_3$ to a value which is the average of the energy measured at time $t_2$ and time $t_3$. The measurements proceed in subsequent time periods in the same manner.

In the first embodiment, the controller 150 assesses the size of each successive increase, $x_1$ and $x_2$, in the average energy A. If such an increase exceeds a predetermined margin, the receiver is deemed to have possibly detected the transmission of the transmitter 200, and the controller 150 enables the supply of power to all stages of the receiver 200. Otherwise, the power supply remains inhibited. Thus, depending on the level of unwanted signals, the level of the wanted signal, the number of time periods contributing energy to the averaging, and the value of the predetermined margin, the power may be enabled at time $t_2$ or time $t_3$, in which case the receiver 300 can process the wanted signal received from the transmitter 200.

In a variation of the operation described above with reference to FIG. 2, the controller 150 may take account of the rate of change of the average energy level A in determining whether to enable the supply of power, for example by assessing the combined value $x_1+x_2$, which represents the increase over two successive time periods.

FIG. 3, graph a) illustrates the power P at the desired operating frequency that reaches the coil 60 of the receiver 300 as a function of time t. The low initial power represents unwanted power, that is power emitted by sources other than the transmitter 200. At time $t_n$ an additional source of unwanted power starts transmitting or comes into range of the receiver 300, causing an increase in the power P. At time $t_{rx}$, the power increases again because the transmitter 200 commences transmission of a signal to the receiver 300.

FIG. 3, graph b) illustrates the energy E measured by the receiver 300 in intermittent time periods occurring at times $t_0$ to $t_6$. The measured energy level increases at time $t_2$ from $E_1$ to $E_2$, which is the first measurement following the commencement of the unwanted transmission at time $t_n$, and again at time $t_3$ from $E_2$ to $E_3$, which is the first measurement following the commencement of transmission at time $t_{rx}$ by the transmitter 200.

FIG. 3, graph c) illustrates the average energy A measured over a plurality of the time periods illustrated in graph b); in this example the plurality is two, the averaging being performed over a window encompassing two of the time periods and stepped in increments equal to the interval between the intermittent time periods. The initial level of the average energy, preceding time $t_1$, is determined by the energy preceding time $t_0$ but which is not represented in graphs a) or b). The initial level of the average energy $A_1$ is maintained until time $t_2$, at which point the average energy A increases to a level $A_2$ due to the inclusion in the average of the energy $E_2$ measured at time $t_2$ and the discarding of the energy $E_1$ measured at time $t_0$; the increased average value $A_2$ is the average of the energy $E_1$ and $E_2$ measured at, respectively, time $t_1$ and time $t_2$. The average energy A increases again at time $t_3$ to a level $A_3$ which is the average of the energy $E_2$ and $E_3$ measured at, respectively, time $t_2$ and time $t_3$.

In the second embodiment, the controller 150 assesses the level of each successive measured energy E relative to the average energy level A. If the level of such energy E exceeds the level of the average energy A by a predetermined margin, the receiver 300 is deemed to have possibly detected the transmission of the transmitter 200, and the controller 150 enables the supply of power to all stages of the receiver 200. Otherwise, the power supply remains inhibited. In the example of FIG. 3, in successive assessments in successive time periods, the energy level $E_1$ is compared with the current average energy level $A_1$, the energy level $E_2$ is compared with the current average energy level $A_2$, and the energy level $E_3$ is compared with the current average level $A_3$. In a variation of this scheme, the energy level may be compared with the preceding average energy level, thereby excluding the effect of the latest energy measurement from the average; thus the energy level $E_1$ is compared with average energy level $A_1$, the energy level $E_2$ is also compared with the average energy level $A_1$, and the energy level $E_3$ is compared with the average energy level $A_2$. The measurements and comparisons proceed in subsequent time periods in a similar manner.

Thus, depending on the level of unwanted signals, the level of the wanted signal, the number of time periods contributing to the averaging, and the value of the predetermined margin, the power may be enabled at time $t_2$ in response to noise, or time $t_3$ in response to the wanted signal, in which case the receiver 300 can process the wanted signal received from the transmitter 200.

In a variant of the second embodiment, instead of the criterion for deeming the receiver 300 to have possibly detected the transmission being whether the energy E in one of the intermittent time periods exceeds the average energy A by a predetermined margin, the criterion may be whether the energy E in more than one of the intermittent time periods, preferably consecutive, exceeds the average energy A by a predetermined margin.

Suitable values for the number of time periods contributing energy to the averaging, and the value of the predetermined margin for either embodiment, may be determined for different environments by experimentation, to provide a receiver 300 that provides a balance between: the reliability of detection of wanted signals in the presence of unwanted signals; the failure to detect wanted signals in the presence of unwanted signals; the waste of power due to enabling the supply of power in the presence of only unwanted signals; and the waste of power due to enabling the supply of power in the presence of wanted signals that are too small, relative to the unwanted signals, for reliable decoding. In particular, the invention enables the receiver 300 to adapt to changes in the level of unwanted signals, and can reduce the likelihood that changing levels of unwanted signals result in increased power consumption.

By way of example, the interval between intermittent time periods may be 15 ms, the measurement duration for each of the intermittent time periods may be 20 μs, the number of intermittent time periods over which averaging is performed may be 20, and for the first embodiment the predetermined margin for the increase in average energy may be 2 dB, while for the second embodiment the predetermined margin for the energy E exceeding the average energy A may be 8 dB.

In a further embodiment, the controller 150 may implement the assessment criteria of both the first and second embodiments described above, and enable the supply of power if either criteria are met, that is if the average energy A increases by more than a predetermined margin or the energy level E in one or more of the intermittent time periods exceeds the average energy A by more than a predetermined margin.

In the embodiments described, the averaging of energy has been performed, for the purpose of illustrating the concept, over two of the intermittent time periods. In practice, the averaging may be performed over more than two of the intermittent time periods, although the speed of detecting a wanted signal may be reduced as the number of time periods is increased.

In the embodiments described, the averaging has been performed in a window that is stepped through overlapping positions. Alternatively, the window may be stepped through non-overlapping positions.

In the embodiments described, the levels of energy in a plurality of the time periods have been averaged. The term average is not intended to be limited to any particular mathematical function, such as a arithmetic average or geometric average, but is intended to include any function of a plurality of measured energy levels. Furthermore, the function is not intended to be time limited, but may be a recursive function dependent on the level of energy measured in an indefinite number of the intermittent time periods. For example, the average may be evaluated according to the function $A_n=(1-\alpha)A_{n-1}+\alpha \cdot E_n$, where $A_n$ is the average value generated for the $n^{th}$ time period, $A_{n-1}$ is the average value generated for the $(n-1)^{th}$ time period, $E_n$ is the level of energy in the $n^{th}$ time period, and $\alpha$ is a constant less than unity. The value of $\alpha$ may be, for example, 1/16. Such a function requires only a small storage.

In the examples illustrated in FIGS. 2 and 3, the intermittent time periods are periodic. However, this is not an essential requirement and alternatively the intermittent time periods may be unequally spaced in time. Furthermore, the intermittent time periods need not all have the same duration.

Optionally, the measurement circuit 130 may be coupled to alternative or additional points in the receiver 300 for measuring the level of received energy, such as an output of the coil 60, the tuner 70, the downconverter 90 or the demodulator 100. The level of received energy in each of the intermittent time periods may be determined, for example, as a sum or an average of samples of received signal level.

Optionally, after the receiver 300 has enabled the supply of power to circuitry, it may retune to a different frequency in order to detect a further signal transmitted by the transmitter 200 on the different frequency and to engage in communication with the transmitter 200. In this way, one frequency, for example 8 MHz, may be used for initially invoking a communication link, and a different frequency, for example 10 MHz may be used to continuing the communication.

Optionally, the signal transmitted by the transmitter 200 may comprise both frequency modulation and amplitude modulation, and the receiver 300 may be adapted to demodulate the amplitude modulation and to remain powered-up to demodulate subsequent frequency modulation only if the amplitude modulation conveys a predetermined code. In this way, power saving may be improved as the receiver 300 will refrain from decoding signals in which the amplitude modulation conveys an inapplicable code.

The receiver 300 may be part of a transceiver that also includes a transmitter.

Additional power saving measures may be included. For example, if the synchroniser 110 fails to synchronise to a received signal, the supply of power to those stages of the receiver 300 that are power controlled may be inhibited. As another example, the supply of power may be terminated after a received message has been decoded, and acknowledged if required.

Although the invention has been described with reference to a magnetic induction receiver 300, the invention may be used with other types of receivers, particularly where it is desirable to minimise power consumption, such as in a portable devices.

Portions of the receiver 300 may be implemented in analogue or digital hardware, or, particularly the measurement circuit 130, the evaluation circuit 140 and the controller 150, in computer software or computer program code executed by a processor, such as a digital signal processor. The computer software or computer program code can be carried by a computer readable medium. The medium may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like.

From reading the present disclosure, other variations and modifications will be apparent to the skilled person. Such variations and modifications may involve equivalent and other features which are already known in the art of wireless communications, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several elements recited in the claims and reference signs in the claims shall not be construed as limiting the scope of the claims.

The invention claimed is:

1. A method of operating a wireless receiver, comprising:
   measuring, using a measurement circuit, a level of energy received in each of a plurality of intermittent time periods corresponding to successive positions of a sliding window, wherein the measurement circuit is controlled in response to a controller circuit to measure the plurality of intermittent time periods at times that are separated from each other by one or more additional time periods;
   generating, in an energy-evaluation circuit, a first value dependent on levels of energy in a first plurality of the time periods; and
   enabling, using the controller circuit and dependent on the first value, a supply of power to a circuit wherein the controller circuit assesses the first value and subsequent measurements taken by the measurement circuit based on the first value to determine whether the supply of power is to be enabled, wherein the plurality of intermittent time periods have a set of characteristics including unequal spacing of the intermittent time periods in time, at least two of the intermittent time periods having different durations, or a combination thereof;
   the sliding window includes overlapping positions, the method further comprising:
   generating a second value dependent on the levels of energy in a second plurality of the time periods, the second plurality including at least one time period occurring later than the time periods of the first plurality; and
   enabling the supply of power if the second value exceeds the first value by more than a first margin.

2. The method as claimed in claim 1, wherein
   for each of the plurality of intermittent time periods, the measuring of the level of energy received includes, sampling a plurality of samples in the time period and summing energy levels of the plurality of samples; and
   at least one of the time periods is common to the first plurality of time periods and the second plurality of time periods.

3. The method as claimed in claim 1, further comprising determining whether the supply of power if the level of energy in at least one of the time periods exceeds the first value by more than a second margin; and
   wherein, for each of the plurality of intermittent time periods, the measuring of the level of energy received includes, sampling a plurality of samples in the time period and averaging energy levels of the plurality of samples.

4. The method as claimed in claim 1, further comprising generating at least one of the first value and the second value according to a recursive function of the levels of energy in the respective plurality of time periods.

5. The method as claimed in claim 1, further comprising generating at least one of the first value and the second value according to a function $A_n = (1-\alpha)A_{n-1} + \alpha \cdot E_n$, where $A_n$ is a value generated for an $n^{th}$ time period, $E_n$ is a level of energy in the $n^{th}$ time period, and $\alpha$ is a constant less than unity.

6. A non-transitory computer-readable storage medium having a computer program adapted to perform the method of claim 1.

7. The method as claimed in claim 1, further comprising in response to enabling the supply of power to the circuit:
   receiving a signal;
   demodulating an amplitude modulated portion of the signal to produce an amplitude demodulated signal; and
   in response to the amplitude demodulated signal being inconsistent with a code stored at the receiver disabling the supply of power to the circuit.

8. The method as claimed in claim 7, further comprising:
   in response to the amplitude demodulated signal being consistent with the code stored at the receiver, demodulating a frequency modulated portion of the signal.

9. The method as claimed in claim 1, further comprising controlling, using the controller circuit, the time periods over which the measurement circuit generates the level of energy in each of the plurality of intermittent time periods.

10. A wireless receiver, comprising:
    a measurement circuit for measuring a level of energy received in each of a plurality of intermittent time periods, the plurality of intermittent time periods having a set of characteristics including unequal spacing of the intermittent time periods in time, at least two of the intermittent time periods having different durations, or a combination thereof;
    an evaluation circuit for generating a first value dependent on levels of energy in a first plurality of the time periods; and a controller including circuitry and configured for enabling, dependent on the first value, a supply of power to a circuit, wherein the evaluation circuit is configured and arranged to generate a second value dependent on the levels of energy in a second plurality of the time periods and dependent on a different number of time periods than in the first plurality of time periods, the second plurality including at least one time period occurring later than the time periods of the first plurality; and wherein the controller is configured and arranged to enable the supply of power if the second value exceeds the first value by more than a first margin.

11. The wireless receiver as claimed in claim 10, wherein the duration of time between each of the intermittent time periods is more than 2 orders of magnitude greater than a duration of one of the intermittent time periods; and at least one of the time periods is common to the first plurality of time periods and the second plurality of time periods.

12. The wireless receiver as claimed in claim 10, wherein for each of the plurality of intermittent time periods, the measurement circuit is configured to measure the level of energy received in the time period by sampling a plurality of samples in the time period and summing energy levels of the plurality of samples; and the controller is configured and arranged to enable the supply of power if the level of energy in at least one of the time periods exceeds the first value by more than a second margin.

13. The wireless receiver as claimed in claim 10, wherein for each of the plurality of intermittent time periods, the measurement circuit is configured to measure the level of energy received in the time period by sampling a plurality of samples in the time period and averaging energy levels of the plurality of samples; and the evaluation circuit is configured and arranged to generate at least one of the first value and the second value according to a recursive function of the levels of energy in the respective plurality of time periods.

14. The wireless receiver as claimed in claim 10, wherein the evaluation circuit is configured and arranged to generate at least one of the first value and the second value according to a function $A_n = (1-\alpha)A_{n-1} + \alpha \cdot E_n$, where $A_n$ is a value generated for an $n^{th}$ time period, $E_n$ is a level of energy in the $n^{th}$ time period, and $\alpha$ is a constant less than unity.

15. The wireless receiver as claimed in claim 10, wherein the wireless receiver is a magnetic induction receiver.

16. A wireless transceiver comprising the wireless receiver of claim 10.

17. A wireless system comprising the wireless receiver of claim 10.

18. The wireless receiver as claimed in claim 10, wherein the controller is configured and arranged to control the time periods over which the measurement circuit generates the level of energy in each of the plurality of intermittent time periods.

* * * * *